United States Patent Office 3,215,598
Patented Nov. 2, 1965

3,215,598
ANORECTIC COMPOSITIONS AND METHOD OF USING SAME
Harley M. Hanson, North Wales, Pa., assignor to Merck & Co., Inc., Rahway, N.J., a corporation of New Jersey
No Drawing. Filed Oct. 16, 1961, Ser. No. 145,477
7 Claims. (Cl. 167—55)

This invention relates to 2-amino-1-(3,4-dichlorophenyl)-propane, medicinal anorexigenic preparations containing the same and the utilization of such preparations for curbing the appetite in obese persons.

Ordinary obesity is quite common, especially in middle life and is generally more frequent in women than in men, particularly in older age groups. Although heredity may play a contributory role there is only one immediate cause of obesity, a caloric intake persistently exceeding the caloric output. Since the capacity of the body to store protein and carbohydrate is strictly limited, excess food in any form is converted into and stored as fat. As is well known, the accumulation of large amounts of excess fat in the body is extremely detrimental to the health and well being of persons so affected. Thus, it is known that obesity, if present for many months or years, always causes complications, and statistically it increases the mortality rate and lowers life expectancy. Obese persons succumb to cardiovascular-renal disease more frequently than persons of normal weight. Corpulence likewise results in higher death rates from diabetes, nephritis, pneumonia, cirrhosis, biliary disease, appendicitis and post-operative complications. Even death from accidents is considerably more common among the obese.

In view of the seriousness of the obesity problem, a great deal of research in recent years has been directed towards finding a product which would effectively suppress the appetite of obese persons and thereby provide a means for controlling the caloric intake to the extent necessary to inhibit the accumulation of excess fat in the body. One such product which has heretofore been utilized for this purpose is 2-amino-1-phenyl propane, commonly known as amphetamine. Unfortunately, however, amphetamine has certain disadvantages which seriously limit its usefulness as an anorectic. One disadvantage is that amphetamine, when administered at dosage levels sufficient to induce anorexia, also exhibits substantial anti-depressant and hypertensive activity. Because of these additional effects, amphetamine is unsuitable for the treatment of obesity in persons also afflicted with such disorders as hypertension, arteriosclerosis, hyperthyroidism and insomnia. A further disadvantage of amphetamine as an anorectic is that at dosage levels sufficient to induce anorexia, it also produces undesirable sympathomimetic side effects such as jitteriness, excessive stimulation, increased tension or insomnia.

According to the present invention, it has been found that 2-amino-1-(3,4-dichlorophenyl)-propane in either its racemic or optically active d or l-forms, as well as the non-toxic acid addition salts thereof, are highly effective in curbing the appetite in obese persons or other persons susceptible to over-indulgence in food. Furthermore, it has been found that these compounds when administered at dosage levels sufficient to induce anorexia have a low incidence of side effects and do not exhibit any significant amount of anti-depressant or hypertensive activity. In view of the low incidence of side effects and virtual absence of anti-depressant and hypertensive activity, the compounds of the present invention are much more useful as anorectics than amphetamine which, as indicated hereinabove, is known to produce undesirable side effects and exhibit substantial anti-depressant and hypertensive activity when administered at dosage levels sufficient to induce anorexia.

In clinical use, the recommended dosage of the active ingredient is from about 2.5 to about 25 milligrams, and preferably from about 5 to about 15 milligrams of the active ingredient two to four times per day. Accordingly, for convenience of administration and for assurance that the aforementioned dosage requirements are met in routine therapy, the active ingredient is provided in unitary form for administration and, preferably, either in unit dosage form such as tablets, capsules, elixirs, suspensions and the like or in a form readily subdivided into unit doses.

In the preparation of solid orally administrable compositions contemplated by the present invention, the active ingredient may be admixed with a non-toxic pharmaceutical carrier and dry filled into capsules or with the aid of suitable excipients such as binders, lubricants, disintegrating agents, fillers and the like, compressed into tablets, pellets, pills, troches and the like using conventional formulating techniques. Similarly, various liquid formulations suitable for either parenteral or oral administration can be readily prepared with the aid of suitable dispersing agents, suspending agents, emulsifying agents and the like.

If sustained release preparations are desired, i.e., preparations wherein the release of the active constituent is achieved over a period of from 8–12 hours, these may readily be prepared by coating the medicament, medicated seeds or tablets with conventional fatty or waxy materials used for this purpose. In such preparations, the unit dosage of medicament may be increased to as high as 50 milligrams, the particular amount being sufficient to provide a daily regimen within the range set forth hereinbelow.

In the preparation of the compositions contemplated by the present invention, the active ingredient may be employed in its free base form. Preferably, however, a non-toxic pharmaceutically acceptable organic or inorganic acid addition salt of the base is used. Suitable acid addition salts include the sulfate, nitrate, acetate, citrate, phosphate, fumarate, succinate, maleate, sulfamate, lactate, salicylate, tartrate, benzoate and the hydrohalides such as the hydrochloride and hydrobromide. Such salts may be prepared in conventional manner by reacting the free base with the desired acid in a suitable solvent.

In accordance with the method of curbing the appetite in obese persons, a dosage regimen of the 2-amino-1-(3,4-dichlorophenyl)-propane in either its racemic, optically active d or l-forms, or a non-toxic acid addition salt thereof is administered internally, preferably orally, to obese persons in an amount sufficient to induce anorexia. Preferably, the compound combined with a pharmaceutical carrier is administered orally to obese persons in a daily regimen of from about 5 to 100 mgs. and preferably 15 to 45 mgs.

The following examples illustrate the preparation of the active ingredients utilized in the present invention, the incorporation of these active ingredients into representative dosage unit forms and the method of inducing anorexia utilizing such preparations. However, it is to be understood that these examples are given for the purpose of illustrating the present invention and are not to be considered as limiting the invention.

EXAMPLE 1

*Preparation of racemic 2-amino-1-(3,4-dichlorophenyl)-propane*

A. 3,4-DICHLOROBENZYLCYANIDE 122 g. (2.5 moles) of sodium cyanide is dissolved in 110 ml. of warm water in a 2 liter flask equipped with a stirrer, reflux condenser, dropping funnel and thermometer. 390 g. (2 moles) of 3,4-dichlorobenzylchloride diluted with 390 ml. of 2B alcohol is then added in a thin stream over a period of 50 minutes at 40 to 50° C. The mixture is then heated to boiling and refluxed for 5 hours with stirring and then cooled to 10° C. The salts are filtered off, washed 3 times with 100 ml. of cold 2B alcohol and the filtrate concentrated in vacuo to dryness. The residue is dissolved in 1500 ml. of ether, anhydrous magnesium sulfate is added to dry the mixture and the mixture filtered through a layer of Supercel. The Supercel is then washed well with ether. The clear, anhydrous solution thus obtained is distilled in vacuo to remove the ether. Fractional distillation at 160–170° C./10–11 mm. yields the desired product.

B. α-(3,4-DICHLOROPHENYL)-ACETOACETONITRILE 264 g. (4.9 moles) of sodium methoxide is dissolved in 1400 ml. of 2B alcohol in a suitably equipped 3 liter flask and a mixture of 302 g. (1.625 moles) of 3,4-dichlorobenzylcyanide and 475 g. (5.4 moles) of ethyl acetate is added in a steady stream over a 15 minute period. After stirring and refluxing for 4 hours, the reaction mixture is allowed to stand at room temperature overnight and then concentrated in vacuo to dryness. The residue is dissolved in 3.5 liters of water by warming to 60° C. and 20 g. of Darco is added. The mixture is then filtered and the clear filtrate acidified to pH 6.2 with 225 ml. of glacial acetic acid and chilled to 0° C. The crystals of desired product thus obtained are collected, washed ten times with 100 ml. of ice water and air dried at 50° C.

C. 3,4-DICHLOROPHENYLACETONE

A solution of 750 ml. of concentrated sulfuric acid in 182 ml. of water is placed in a 5 liter Morton flask and cooled to 5° C. 318 g. (1.395 moles) of α-(3,4-dichlorophenyl) acetoacetonitrile is added in portions over a period of 20 minutes at 5 to 7° C. The thick slurry is heated to and held at 80° C. for ten minutes, then cooled to 40° C. and 2.7 liters of water added. The mixture is stirred rapidly and heated at 95 to 100° C. for 3 hours, then cooled to 25° C. and extracted 2 times with a liter of ether. The combined ether extracts are washed free of acids with sodium bicarbonate solution, dried over magnesium sulfate, treated with 10 g. of Darco and filtered. The ether is removed in vacuo and the residue (3,4-dichlorophenylacetone) held at 1 mm. to constant weight.

D. 1-(3,4-DICHLOROPHENYL)-2-PROPANONE OXIME 104 g. (1.27 moles) of anhydrous sodium acetate and 175 g. (2.5 moles) of hydroxylamine hydrochloride are dissolved in 420 ml. of water under nitrogen gas in a suitably equipped 5 liter flask. A solution of 256 g. (1.26 moles) of 3,4-dichlorophenylacetone in 2.5 liters of methanol is added and the mixture stirred and refluxed for 2 hours under nitrogen. The reflux condenser is then changed to a down condenser and the methanol distilled until the internal temperature reaches 85° C. 2.5 liters of water is added and the mixture cooled to 25° C. The aqueous layer is decanted from a gummy layer and extracted twice with 1 liter of ether. The combined ether extracts are returned to the gum in the flask and the flask agitated until the gummy material dissolves. The remaining water is then separated and the ether solution washed with 500 ml. of water and dried over magnesium sulfate. The ether is removed in vacuo yielding the desired product.

E. 2-AMINO-1-(3,4-DICHLOROPHENYL)-PROPANE HYDROCHLORIDE 285 g. (1.3 moles) of 1-(3,4-dichlorophenyl)-2-propanone oxime is dissolved in 900 ml. of 2B alcohol. Three tablespoons of Raney nickel catalyst are added and the mixture hydrogenated in a steel bomb at 80° C./800 p.s.i. for 2 hours. After cooling, 5 g. of Darco is added and the mixture filtered. The residue is washed with alcohol and the combined washings and filtrate concentrated in vacuo to dryness. The residue thus obtained is dissolved in 1 liter of ether and alcoholic hydrogen chloride (8N) added until the solution is just acid to Congo red. After cooling to 5° C. (and with the aid of scratching) a nearly solid crystalline mass of the desired product is formed, which is then collected, washed six times with 150 ml. of ether and dried in vacuo. The product may be further recrystallized from methyl ethyl ketone.

EXAMPLE 2

Resolution of racemic 2-amino-1-(3,4-dichlorophenyl)-propane

In 326 ml. of water is dissolved 211.9 g. (0.882 mole) of (±)2-amino-1-(3,4-dichlorophenyl)-propane hydrochloride. The mixture is made alkaline with 76 ml. of 34% sodium hydroxide solution. The free base is extracted with two 200 ml. portions of benzene. The benzene solution is then backwashed with two 70 ml. portions of water, dried over 40 g. of anhydrous magnesium sulfate and concentrated in vacuo to yield the free racemic base.

To 73.5 g. (0.196 mole) of O,O-dibenzoyl-L(+)-tartaric acid monohydrate dissolved in 3 liters of methanol at 60° C. is added a hot solution of 159.5 g. (0.782 mole) of the free racemic base dissolved in 3.2 liters of methanol. The mixture, on cooling, deposits crystals of the normal tartrate salt. After aging overnight at room temperature, the crystals are separated by filtration and washed twice with cold methanol. The base of the white tartrate salt thus obtained is enriched in the (−)-enantiomorph.

To a slurry of 84.1 g. (0.11 mole) of the above tartrate salt in 262 ml. of water is added 135 ml. of 34% sodium hydroxide. The (−)-enriched base is extracted with two 200 ml. portions of ethyl ether and the extract dried over 50 g. of anhydrous magnesium sulfate and concentrated in vacuo. The oil base thus obtained is dissolved in 231 ml. of pyridine and while maintaining the temperature below 20° C., 116.5 ml. of acetic anhydride is added dropwise. The mixture is allowed to warm to room temperature and stand overnight. Upon concentration in vacuo, N-acetyl-2-amino-1-(3,4-dichlorophenyl)-propane crystallizes. After separation, this material is dissolved in 100 ml. of hot acetone and the solution diluted with 200 ml. of hot Skellysolve B. While maintaining the volume constant by the addition of Skellysolve B, the solution is distilled until the cloud point. A little acetone is then added and the solution cooled and allowed to stand for 24 hours at room temperature. The crystals formed (which may be accelerated by scratching) are recovered by filtration and washed with Skellysolve B. Two more crystallizations yielded optically pure (+)-N-acetyl-2-amino-1-(3,4-dichlorophenyl)-propane, M.P. 98.5–99° C., $$[\alpha]_D = +32.1°$$

(c.=2, CHCl$_3$).

To 5.0 g. (0.0203 mole) of the (+)-N-acetyl-2-amino-1-(3,4-dichlorophenyl)-propane is added 100 ml. of concentrated hydrochloric acid. The mixture is purged of air with nitrogen, left under nitrogen and refluxed for 36 hours. After cooling, the mixture is made alkaline to a pH of 12 by the addition of sodium hydroxide and the l-base extracted with two 15 ml. portions of benzene. The benzene extract is dried over anhydrous sodium sulfate and the l-base precipitated by the addition of 2.5 ml. of 8 N ethanolic hydrogen chloride and the mixture filtered yielding the optically active l-2-amino-1-(3,4-dichlorophenyl)-propane hydrochloride, M.P. 188–189° C., $$[\alpha]_D = -24.3°$$

(c.=2, acetic acid).

Employing the above procedure, and starting with O,O-dibenzoyl-D(−)-tartaric acid, there will be obtained the optically active d-2-amino-1-(3,4-dichlorophenyl)-propane hydrochloride. The O,O-dibenzoyl-D(−)-tartaric acid can be prepared by reacting D(—)-tartaric acid with benzoyl chloride in the same manner as described in the literature for the preparation of O,O-dibenzoyl-L(+)-tartaric acid.

EXAMPLE 3

Hard gelatin capsules containing the following ingredients are prepared as follows:

| | Mg. |
|---|---|
| l-2-amino-1-(3,4-dichlorophenyl)-propane hydrochloride | 5 |
| Lactose | 425 |
| Magnesium stearate | 2 |

The ingredients are mixed, screened and dry filled into capsules. One capsule is administered orally to obese persons three times daily to induce anorexia.

EXAMPLE 4

A pharmaceutical preparation suitable for oral administration and containing the following ingredients is prepared as follows:

| | Mg. |
|---|---|
| dl-2-amino-1-(3,4-dichlorophenyl)-propane sulfate | 100 |
| Coconut oil | — |

The active ingredient is suspended in enough coconut oil to fill ten 10 minim soft gelatin capsules and the suspension subdivided by gravity flow into the ten capsules, each containing 10 mg. of active ingredient.

EXAMPLE 5

A tablet having the following composition is prepared as follows:

| | Mg. |
|---|---|
| dl-2-amino-1-(3,4-dichlorophenyl)-propane hydrochloride | 15.0 |
| Dicalcium phosphate | 50.0 |
| Lactose | 40.0 |
| Starch | 15.0 |
| Magnesium stearate | 2.0 |

The active ingredient, lactose and dicalcium phosphate are mixed and granulated with a portion of the starch as a 10% solution. The granules are screened to 16 mesh and dried. After rescreening to 20 mesh, the balance of the starch and magnesium stearate are added and the mixture compressed.

EXAMPLE 6

A syrup having the following composition is prepared as follows:

| | Mg. |
|---|---|
| d-2-amino-1-(3,4-dichlorophenyl)-propane sulfate | 50.0 |
| Sorbitol solution, 70% | 50.0 |
| Buffer (dibasic sodium phosphate and citric acid), q.s. to pH 5.5. | |
| Orange flavor | 10.0 |
| Distilled water, q.s. to 100 ml. | |

All the ingredients are mixed and dissolved in water to form a syrup. Three teaspoons of the syrup are administered orally to obese persons three times daily to induce anorexia.

EXAMPLE 7

A sustained release preparation having the following composition is prepared as follows:

| | Mg. |
|---|---|
| l-2-amino-1-(3,4-dichlorophenyl)-propane sulfate | 50.0 |
| Stearic acid | 100.0 |
| Dicalcium phosphate | 25.0 |

37.5 mg. of the active ingredient is dispersed in the stearic acid by melting the latter and the mixture cooled and ground to 10 to 12 mesh. The dicalcium phosphate is then added and the mixture compressed into a slow release core tablet. The remainder of the active ingredient is then incorporated in a standard sugar coating composition and the coating applied to the core tablet in conventional manner.

Various changes and modifications of this invention can be made and to the extent that such variations incorporate the spirit of this invention, they are intended to be included within the scope of the appended claims.

I claim:

1. A pharmaceutical composition suitable for parenteral administration comprising a compound selected from the group consisting of dl-2-amino-1-(3,4-dichlorophenyl)-propane, d-2-amino-1-(3,4-dichlorophenyl)-propane, l-2-amino-1-(3,4-dichlorophenyl)-propane, and non-toxic acid addition salts thereof in a sterile liquid diluent, said compound being present in an amount of from about 2.5 to about 50 milligrams per unit dose of said composition.

2. A method for curbing the appetite in persons which comprises administering to such persons a compound selected from the group consisting of dl-2-amino-1-(3,4-dichlorophenyl)-propane, d-2-amino-1-(3,4-dichlorophenyl)-propane, 1-2-amino-1-(3,4-dichlorophenyl)-propane, and non-toxic acid addition salts thereof in an amount sufficient to induce anorexia.

3. A method for curbing the appetite in persons which comprises administering to such persons per unit dose between about 2.5 and 50 milligrams of a compound selected from the group consisting of dl-2-amino-1-(3,4-dichlorophenyl)-propane, d-2-amino-1-(3,4,dichlorophenyl)-propane, 1-2-amino-1-(3,4-dichlorophenyl)-propane, and non-toxic acid addition salts thereof.

4. A method for curbing the appetite in persons which comprises administering to such persons a daily regimen of from about 5 to about 100 milligrams of a compound selected from the group consisting of dl-2-amino-1-(3,4-dichlorophenyl)-propane, d-2-amino-1-(3,4-dichlorophenyl)-propane, 1-2-amino-1-(3,4-dichlorophenyl)-propane, and non-toxic acid addition salts thereof.

5. A pharmaceutical composition comprising a tablet containing a tablet adjuvant and as an active anorectic agent a compound selected from the group consisting of dl-2-amino-1-(3,4-dichlorophenyl)-propane, d-2-amino-1-(3,4-dichlorophenyl)-propane, l-2-amino-1-(3,4-dichlorophenyl)-propane, and non-toxic acid addition salts thereof, said compound being present in an amount of from about 2.5 to about 50 milligrams.

6. A pharmaceutical composition comprising an elixir containing as an active anorectic agent a compound selected from the group consisting of dl-2-amino-1-(3,4-dichlorophenyl)-propane, d-2-amino-1-(3,4-dichlorophenyl)-propane, l-2-amino-1-(3,4-dichlorophenyl)-propane, and non-toxic acid addition salts thereof, said compound being present in an amount sufficient to provide from about 2.5 to about 50 milligrams of said compound per dose of said composition.

7. A pharmaceutical composition comprising a syrup containing as an active anorectic agent a compound selected from the group consisting of dl-2-amino-1-(3,4-dichlorophenyl)-propane, d-2-amino-1-(3,4-dichlorophenyl)-propane, l-2-amino-1-(3,4-dichlorophenyl)-propane, and non-toxic acid addition salts thereof, said compound being present in an amount sufficient to provide from about 2.5 to about 50 milligrams of said compound per dose of said composition.

References Cited by the Examiner

UNITED STATES PATENTS

| 2,504,803 | 4/50 | Clark | 260—570.8 |
| 2,527,810 | 10/50 | Goldberg | 260—302 |

OTHER REFERENCES

Holm: Acta Pharmacol. and Toxicology, vol. 17, 1960, pages 121, 125 and 135.

JULIAN S. LEVITT, *Primary Examiner.*

MORRIS O. WOLK, *Examiner.*